(12) United States Patent
Takada

(10) Patent No.: US 6,934,106 B2
(45) Date of Patent: Aug. 23, 2005

(54) MUSIC STORAGE APPARATUS AND PICTURE STORAGE APPARATUS

(75) Inventor: Takayuki Takada, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 189 days.

(21) Appl. No.: 10/346,570

(22) Filed: Jan. 17, 2003

(65) Prior Publication Data

US 2003/0147625 A1 Aug. 7, 2003

(30) Foreign Application Priority Data

Jan. 21, 2002 (JP) ........................................ 2002-011199

(51) Int. Cl.⁷ .............................................. G11B 15/18
(52) U.S. Cl. ................................................... 360/69
(58) Field of Search ............................ 360/69; 386/39, 386/46, 68, 94, 95, 96, 52, 97, 98, 104–106

(56) References Cited

U.S. PATENT DOCUMENTS

| | | | | |
|---|---|---|---|---|
| 6,108,486 A | * | 8/2000 | Sawabe et al. | 386/98 |
| 6,166,313 A | | 12/2000 | Miyamoto | |
| 6,289,166 B1 | * | 9/2001 | Uno et al. | 386/46 |
| 6,330,394 B1 | * | 12/2001 | Itoi | 386/113 |
| 6,442,475 B1 | * | 8/2002 | Utsui et al. | 701/200 |
| 6,516,269 B2 | * | 2/2003 | Takeuchi | 701/211 |
| 6,529,681 B1 | * | 3/2003 | Ando et al. | 386/95 |
| 6,580,869 B1 | * | 6/2003 | Ando et al. | 386/68 |
| 6,600,993 B1 | * | 7/2003 | Kaneko et al. | 701/208 |
| 6,658,200 B2 | * | 12/2003 | Ando et al. | 386/95 |
| 6,697,565 B2 | * | 2/2004 | Ando et al. | 386/95 |
| 6,704,492 B2 | * | 3/2004 | Ando et al. | 386/94 |
| 6,738,698 B2 | * | 5/2004 | Ichihara et al. | 701/36 |
| 6,741,799 B2 | * | 5/2004 | Ando et al. | 386/95 |
| 6,744,968 B1 | * | 6/2004 | Imai et al. | 386/52 |
| 6,768,863 B2 | * | 7/2004 | Ando et al. | 386/95 |
| 6,771,447 B2 | * | 8/2004 | Watanabe et al. | 360/69 |
| 6,775,461 B2 | * | 8/2004 | Poslinski et al. | 386/46 |
| 6,782,189 B2 | * | 8/2004 | Ando et al. | 386/68 |

* cited by examiner

*Primary Examiner*—David Hudspeth
*Assistant Examiner*—Fred F. Tzeng
(74) *Attorney, Agent, or Firm*—Brinks Hofer Gilson & Lione

(57) ABSTRACT

In a music storage apparatus, a control unit controls a signal switching unit so that audio signals supplied from a digital radio tuner or a CD player are transmitted to both an amplifier and an encoder. The control unit also determines whether a musical piece is completely provided to the user, based on program information or TOC information obtained from the digital radio tuner or the CD player. Audio signals of a musical piece that is incompletely provided are deleted from a hard disk.

21 Claims, 6 Drawing Sheets

MUSIC STORAGE APPARATUS AND PICTURE STORAGE APPARATUS

BACKGROUND OF THE INVENTION

1. Field of the Invention

The present invention relates to a music storage apparatus that records music in a hard disk or in another recording medium, and to a picture storage apparatus that records a picture in a hard disk or in another recording medium.

2. Description of the Related Art

In recent years, hard disks have experienced significant increases in speed and capacity and decreases in cost, and are used not only for data storage apparatuses in personal computers, but also for other applications. For example, while map data are generally stored in a CD-ROM or a DVD-ROM in conventional car navigation systems, navigation systems in which map data are stored in a hard disk have recently been put into practical use.

In this type of navigation system, a hard disk has sufficient free space other than a storage space for map data. Therefore, the navigation system also functions as a music storage apparatus in which a musical piece or a radio program that the user is listening to is automatically recorded (downloaded) in the free space.

Hereinafter, music data for one musical piece recorded in the music storage apparatus will be referred to as a "music file". A music file recorded in the music storage apparatus is read from the hard disk, and is converted into analog audio signals to be played back.

However, the above-described conventional storage apparatuses have the following problems. In the conventional music storage apparatuses, in a case in which playback of a musical piece recorded in, for example, a CD is stopped halfway by the user, portions of the musical piece which have been already played back are recorded as a music file in the hard disk. For this reason, when music files recorded in the hard disk are played back, in some cases the playback of a certain musical piece is broken off, and the playback of a succeeding musical piece is then started. This decreases the ease of use. Moreover, since such a partial music file is rarely used, the storage capacity of the hard disk is wasted.

While musical pieces recorded in a CD can be selected one by one to be recorded as a music file in the above navigation systems, it is troublesome for the user to select desired musical pieces one by one.

Furthermore, picture storage apparatuses have been under development in which a hard disk is incorporated in a video device, such as a television, and a program the user is viewing is automatically recorded in the hard disk. Such picture storage apparatuses may also cause problems similar to those in the above-described music storage apparatuses.

SUMMARY OF THE INVENTION

Accordingly, an object of the present invention is to provide a music storage apparatus in which only a desired musical piece of the musical pieces that a user is listening to is automatically recorded in order to efficiently use a recording device such as a hard disk.

Another object of the present invention is to provide a picture storage apparatus in which only a desired picture of the pictures that a user is viewing is automatically recorded in order to efficiently use a recording device such as a hard disk.

In order to achieve the above objects, according to one aspect, the present invention provides a music storage apparatus including an audio signal source for providing audio signals, an audio-signal recording unit for recording the audio signals supplied from the audio signal source, an audio-signal switching unit for providing one of the audio signals supplied from the audio signal source and the audio signals recorded in the audio-signal recording unit, and a control unit for controlling the audio-signal recording unit and the audio-signal switching unit in response to the operation by a user, wherein the control unit starts recording audio signals of a musical piece in the audio-signal recording unit in synchronization with the start of playing of the musical piece, leaves audio signals of only an unoperated musical piece in the audio-signal recording unit, and deletes audio signals of an operated musical piece from the audio-signal recording unit, the unoperated musical piece not being subjected to a specific operation during the playing thereof and the operated musical piece being subjected to the specific operation during the playing thereof.

In this embodiment, the audio-signal recording unit records audio signals of only an unoperated musical piece that is not subjected to a specific operation, such as stop (including pausing), fast-forwarding, fast-reversing, tracking-up, tracking-down, scanning, or channel selection, during the playing thereof, of audio signals provided from the audio signal source. For example, when a musical piece recorded in a CD is played back, the control unit compares the length of the musical piece and the playback elapsed time which can be acquired from TOC (Table Of Contents) information and information in a Q-channel subcode recorded with audio data, and determines, on the basis of the result of comparison, whether the musical piece is being played back. When an operation, such as track search, is performed during playback of the musical piece, the control unit stops recording in the audio-signal recording unit and deletes audio signals that have been recorded in the audio-signal recording unit.

Consequently, only audio signals of musical pieces that are completely provided to the user are recorded in the audio-signal recording unit. Therefore, when the audio signals recorded in the audio-signal recording unit are played back, the musical pieces will not break off, and the user will not be frustrated. In addition, the storage capacity of the audio-signal recording unit can be used efficiently.

While audio signals may be recorded in an uncompressed state in the audio-signal recording unit, preferably, they are compressed by an audio-signal compression method, such as MP3 (MPEG1 Audio Layer 3), AAC (Advanced Audio Coding), or ATRAC (Adaptive Transfer Acoustic Coding), because audio signals of multiple musical pieces can be recorded in the audio-signal recording unit.

According to another aspect, the present invention provides a music storage apparatus including an audio signal source for providing audio signals, an audio-signal recording unit for recording the audio signals supplied from the audio signal source, an audio-signal switching unit for providing one of the audio signals supplied from the audio signal source and the audio signals recorded in the audio-signal recording unit, and a control unit for controlling the audio-signal recording unit and the audio-signal switching unit in response to the operation by a user, wherein the control unit starts recording audio signals of a musical piece in the audio-signal recording unit in synchronization with the start of playing of the musical piece, and adds, to the audio signals to be recorded in the audio-signal recording unit, data for discriminating an unoperated musical piece that is not subjected to a specific operation and an operated musical piece that is subjected to the specific operation during the playing thereof.

In this embodiment, when audio signals supplied from the audio signal source are recorded in the audio-signal recording unit, they are accompanied with data for discriminating an unoperated musical piece that is not subjected to a specific operation, such as stop (including pausing), fast-forwarding, fast-reversing, tracking-up, tracking-down, scanning, or channel selection, and an operated musical piece that is subjected to the specific operation during the playing thereof. Therefore, for example, it possible to play back only musical pieces that are completely provided to the user, and to delete audio signals, which are broken off, from the audio-signal recording unit.

According to a further aspect, the present invention provides a picture storage apparatus including a video signal source for providing video signals, a video-signal recording unit for recording the video signals supplied from the video signal source, a video-signal switching unit for providing one of the video signals supplied from the video signal source and the video signals recorded in the video-signal recording unit, and a control unit for controlling the video-signal recording unit and the video-signal switching unit in response to the operation by a user, wherein the control unit starts recording of video signals of a program in the video-signal recording unit in synchronization with the start of the program, leaves video signals of only an unoperated program in the video-signal recording unit, and deletes video signals of an operated program from the video-signal recording unit, the unoperated program not being subjected to a specific operation by the end of the program and the operated program being subjected to the specific operation by the end of the program.

In this embodiment, the video-signal recording unit records, of video signals supplied from the video signal source, only video signals of an unoperated program that is not subjected to a channel selecting operation, such as a change of a program the user is viewing, by the end of the program.

For example, in a case of a digital television, when a specific operation, such as channel change, is performed, the control unit can determine whether the specific operation is performed during the program, according to program information (tag) sent with the program. When an operation, e.g., channel change, is performed during the program, recording in the video-signal recording unit is stopped and video signals that have been recorded in the video-signal recording unit are deleted. Consequently, only video signals of a program that is completely provided to the user are recorded in the video-signal recording unit. Therefore, video signals recorded in the video-signal recording unit will not break off during playback, and the user will not be frustrated. In addition, the storage capacity of the video-signal recording unit can be used efficiently.

According to a further aspect, the present invention provides a picture storage apparatus including a video signal source for providing video signals, a video-signal recording unit for recording the video signals supplied from the video signal source, a video-signal switching unit for providing one of the video signals supplied from the video signal source and the video signals recorded in the video-signal recording unit, and a control unit for controlling the video-signal recording unit and the video-signal switching unit in response to the operation by a user, wherein the control unit starts recording video signals of a program in the video-signal recording unit in synchronization with the start of the program, and adds, to the video signals recorded in the video-signal recording unit, data for discriminating between an unoperated program that is not subjected to a specific operation and an operated program that is subjected to the specific operation by the end of the program.

In this embodiment, when video signals supplied from the video signal source are recorded in the video-signal recording unit, they are accompanied with data for discriminating between an unoperated program that is not subjected to a channel selection operation, such as a change of the program, and an operated program that is subjected to the channel selection operation by the end of the program. Consequently, for example, it is possible to play back only a program that is completely provided to the user, and to delete video signals broken off during the program from the video-signal recording unit.

Further objects, features, and advantages of the present invention will become apparent from the following description of the preferred embodiments with reference to the attached drawings.

DESCRIPTION OF THE PREFERRED EMBODIMENTS

Embodiments of the present invention will be described below with reference to the attached drawings.

[First Embodiment]

Figure 1:
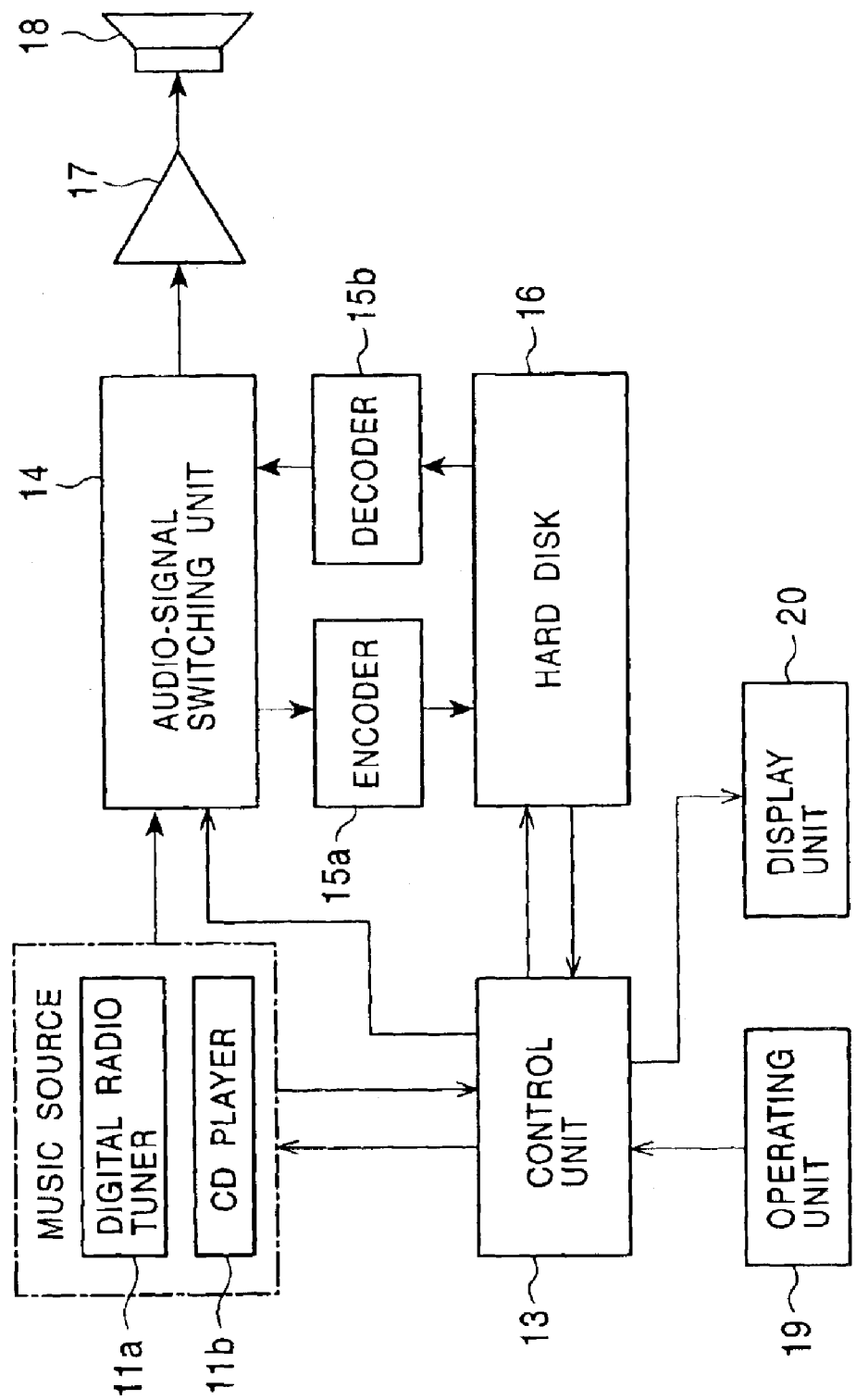
FIG. 1 is a block diagram showing the configuration of a music storage apparatus according to a first embodiment of the present invention.

FIG. 1 is a block diagram showing the configuration of a music storage apparatus according to a first embodiment of the present invention.

The music storage apparatus of the first embodiment includes music sources, such as a digital radio tuner 11*a* and a CD player 11*b*, a control unit 13, an audio-signal switching unit 14, an encoder 15*a*, a decoder 15*b*, a hard disk 16, an amplifier 17, a speaker 18, an operating unit 19, and a display unit 20. While music files are stored in the hard disk 16 in the music storage apparatus, as will be described later, the hard disk 16 does not need to store only music files, and may store other data. For example, music files may be recorded in a free space in a hard disk that stores map data in a car navigation system.

The music sources, such as the digital radio tuner 11*a* and the CD player 11*b*, are operated in response to a signal from the control unit 13 to provide audio signals to the audio-signal switching unit 14.

The audio-signal switching unit 14 switches between input signals and output signals according to a signal from the control unit 13. For example, in a first operation mode in which music is not recorded in the hard disk 16, the audio-signal switching unit 14 directly transmits audio signals received from the music source, such as the digital radio tuner 11a or the CD player 11b, to the amplifier 17. In a second operation mode in which music is recorded in the hard disk 16, the audio-signal switching unit 14 supplies audio signals received from the music source to both the amplifier 17 and the encoder 15a. In a third operation mode in which a music file recorded in the hard disk 16 is played back, the audio-signal switching unit 14 receives audio signals from the decoder 15b, and transmits the audio signals to the amplifier 17.

The encoder 15a converts analog audio signals received from the audio-signal switching unit 14 into digital audio signals and compresses (encodes) the digital audio signals by an audio-signal compression method, such as MP3, AAC, or ATRAC, thereby creating a music file. The music file is recorded in the hard disk 16.

The decoder 15b decompresses (decodes) a music file read from the hard disk 16, converts the music file into analog audio signals, and provides the analog audio signals to the audio-signal switching unit 14.

The operating unit 19 includes various control buttons for operating the music storage apparatus. The control unit 13 controls the music sources, such as the radio tuner 11a and the CD player 11b, the audio-signal switching unit 14, and the hard disk 16 in response to a signal from the operating unit 19. The control unit 13 also displays information, such as the title of a musical piece that is being played, the album title, and the artist name, on the display unit 20.

When a CD is used as the music source, TOC information of the CD includes data on the number of musical pieces recorded therein, and the starting positions of the musical pieces (absolute time indicating the start position of each track). An audio-information recording area of the CD includes a subcode as well as audio data. A part of the subcode, called a Q-channel, includes data on the elapsed time of a musical piece that is being played (relative time from the head of a track). Therefore, it is possible to detect the remaining time of a musical piece that is being played and the presence of the next musical piece, on the basis of the TOC information and the data in the Q-channel.

When a digital radio is used as the music source, program information (tag) sent along with a program includes an artist/song label. The artist/song label includes data on the length (period) of a musical piece that is being played, the elapsed time, and the length of the next musical piece, as well as data on the artist name and the title of a musical piece. Therefore, it is possible to detect the remaining time of a musical piece that is being played, on the basis of data in the artist/song label.

Figure 2:
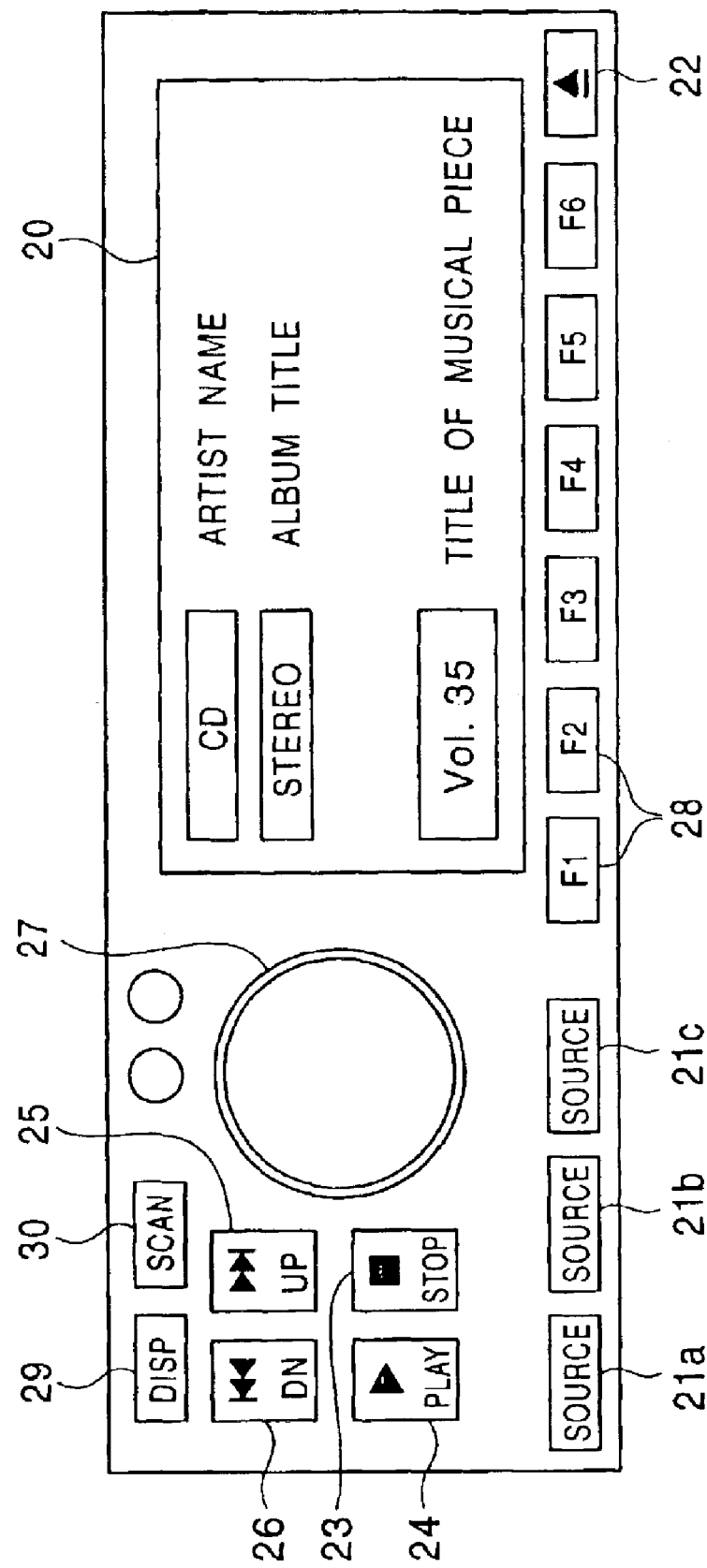
FIG. 2 illustrates an example of a front panel of the music storage apparatus of the first embodiment.

FIG. 2 shows an example of a front panel of the music storage apparatus of the first embodiment. The front panel is provided with a liquid crystal panel or an organic EL panel serving as the display unit 20 capable of displaying characters, as shown in FIG. 2. The front panel also includes various buttons that constitute the operating unit 13, such as input-source switching buttons 21a to 21c, an eject button 22, a stop button 23, a playback button 24, a track search button (succeeding track) 25, a track search button (preceding track) 26, a jog dial 27 used to adjust the volume, preset buttons 28, a display switching button 29, and a scan button 30.

Herein, it is assumed that the digital radio tuner 11a is selected by pressing the input-source switching button 21a, that the CD player 11b is selected by pressing the input-source switching button 21b, and that the hard disk 16 is selected by pressing the input-source switching button 21c. While the digital radio tuner 11a is selected, a channel is changed by pressing the track search button 25 or 26. While the CD player 11b or the hard disk 16 is selected, a musical piece (track) is changed by pressing the track search button 25 or 26. Fast-forward operation is performed by continuously pressing the track search button 25 for more than a predetermined period (for example, two seconds), and fast-reverse operation is performed by continuously pressing the track search button 26 for more than a predetermined period.

When the playback button 24 is pressed in a state in which a CD is loaded in the CD player 11b, playback of the CD is started. The playback of the CD is stopped by pressing the stop button 23, and the CD loaded in the CD player 11b is ejected by pressing the eject button 22. When the scan button 30 is pressed in a state in which a CD is loaded in the CD player 11b, an introduction of every musical piece recorded on the CD is played back for several seconds.

Operation of the music storage apparatus according to the first embodiment will be described below.

As described above, the music storage apparatus of the first embodiment operates in three modes, that is, a first operation mode in which a CD is played back or a radio broadcast is received without recording music, a second operation mode in which music that is being broadcast from the digital radio or music that is being played back by the CD player is recorded as a music file in the hard disk 16 while the music is being provided to the user, and a third operation mode in which a music file recorded in the hard disk 16 is played back.

In the first operation mode, the control unit 13 controls the audio-signal switching unit 14 so that audio signals received from the digital radio tuner 11a or the CD player 11b are directly transmitted from the audio-signal switching unit 14 to the amplifier 17. Consequently, music is provided from the speaker 18.

In the second operation mode, the control unit 13 controls the audio-signal switching unit 14 so that audio signals received from the digital radio tuner 11a or the CD player 11b are transmitted from the audio-signal switching unit 14 to both the amplifier 17 and the encoder 15a. The encoder 15a converts the input analog audio signals into digital audio signals, and compresses the digital audio signals by an audio-signal compression method, such as MP3, AAC, or ATRAC, thereby creating a music file. The music file is stored in the hard disk 16.

In this way, music that the user is listening to is recorded in the hard disk 16. When a music file is recorded in the hard disk 16, data indicating the recording date (timestamp) is automatically added to the music file.

The compression method is not limited to MP3, AAC, or ATRAC described above, and other data compression methods may be adopted.

When recording a digital radio program, it is preferable to add program information (tag) sent together with the program, such as information about the artist name and the title of a musical piece, to the music file. When playing back a CD by the CD player 11b, it is preferable to acquire information about a musical piece, such as the album title, the artist name, and the title of the musical piece, from a CD database such as CDDB, and to add the information to the music file. This makes it possible to search for music files recorded in the hard disk 16 by the artist name or the title of the musical piece, and to display the title of a musical piece that is being played back and the artist name on the display unit 20. The CD database may be stored in the hard disk 16 beforehand, or may be acquired from an external server or the Internet through a communication means such as a vehicle-mounted mobile telephone.

In the third operation mode, the control unit 13 controls the hard disk 16 to read a music file. The music file is sent to the decoder 15b to be decompressed, and is then converted into analog audio signals. The audio signals are sent to the amplifier 17 through the audio-signal switching unit 14, are amplified by the amplifier 17, and are supplied to the speaker 18. Consequently, music is provided from the speaker 18.

Figure 3:
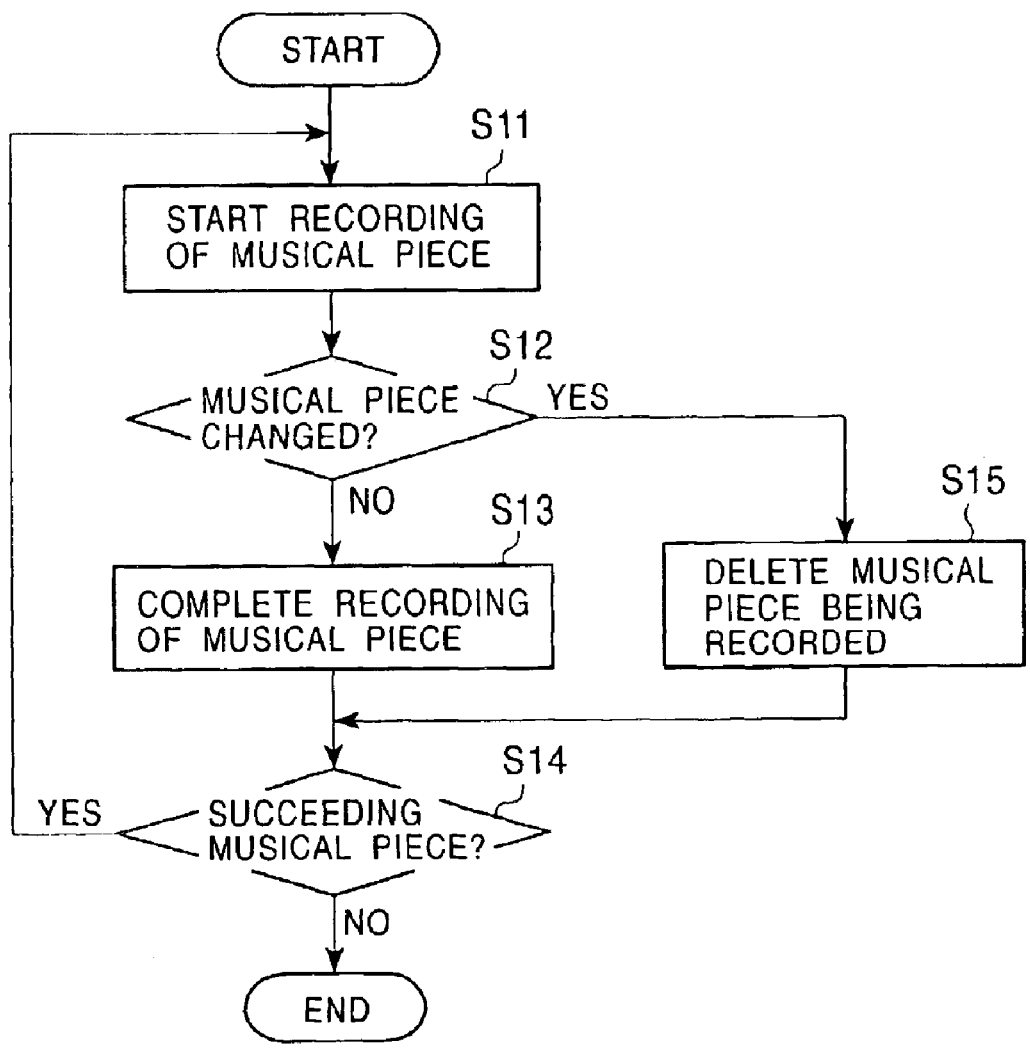
FIG. 3 is a flowchart showing the operation of the music storage apparatus of the first embodiment.

The second operation mode of the music storage apparatus of the first embodiment will be described in detail below with reference to a flowchart shown in FIG. 3.

First, in Step S11, the music storage apparatus starts to record a musical piece simultaneously with the start of playing of the musical piece. In Step S12, it is determined whether or not directions to change the musical piece are given while the musical piece is being played, that is, whether any of the track search buttons 25 and 26, the stop button 23, and the scan button 30 is pressed. When any such button is not pressed, recording of the musical piece is stopped simultaneously with the end of playing of the musical piece in Step S13.

The control unit 13 can acquire information about the length (absolute time) of the musical piece and the elapsed time according to program information (tag) sent from the digital radio tuner 11a, or TOC information and information in the Q-channel of the subcodes sent from the CD player 11b. Therefore, the control unit 13 can determine whether the musical piece is being played or has been completely played, by comparing the length of the musical piece and the elapsed time.

In Step S14, it is determined whether or not a succeeding musical piece is present. In the case of CDs, it is determined, on the basis of TOC information, whether a succeeding musical piece is present. In the case of the digital radio, it is determined that a succeeding musical piece is present unless recording in the hard disk 16 is stopped by the user.

When it is determined that a succeeding musical piece is present, Step S11 is performed again so that the succeeding musical piece is recorded. In this way, the musical piece that the user is listening to is recorded as a music file in the hard disk 16.

In a case in which directions to change the musical piece are given in Step S12, for example, in a case in which any of the track search buttons 25 and 26, the stop button 23, and the scan button 30 is pressed, Step S15 is performed. The music file of the musical piece that is being recorded when the directions are given is deleted, and Step S14 is performed.

In Step S14, it is determined whether or not a succeeding musical piece is present. When a succeeding musical piece is present, Step S11 is performed again so that the succeeding musical piece is recorded.

When it is determined in Step S14 that a succeeding musical piece is not present, for example, when playing of the last musical piece recorded in the CD is completed, recording of the music file in the hard disk 16 is completed.

In the first embodiment, as described above, a music file of a musical piece that is incompletely played is deleted. Only musical pieces that are completely played are recorded in the hard disk 16. Therefore, the playback of the musical pieces is not stopped halfway, and this does not frustrate the user. Moreover, since unnecessary music files do not remain in the hard disk 16, the hard disk 16 can be used efficiently.

While the audio signals (music file) supplied from the music source are recorded in the hard disk 16 after being compressed by the encoder 15a in the above first embodiment, they may be converted into digital signals and may be recorded in the hard disk 16 without being subjected to compression.

While analog audio signals supplied from the music source are converted into digital audio signals and are then compressed by the encoder 15a in the above first embodiment, the present invention is not limited thereto. For example, an encoder may be provided between the audio-signal switching unit 14 and the hard disk 16 to encode digital audio signals supplied from the music source into a format that allows the digital audio signals to be recorded in the hard disk 16. In this case, it is necessary to provide a decoder for reading signals from the hard disk 16 and providing digital audio signals, and a D/A (digital/analog) converter placed before the amplifier 17 to convert digital audio signals into analog audio signals.

[Second Embodiment]

Figure 4:
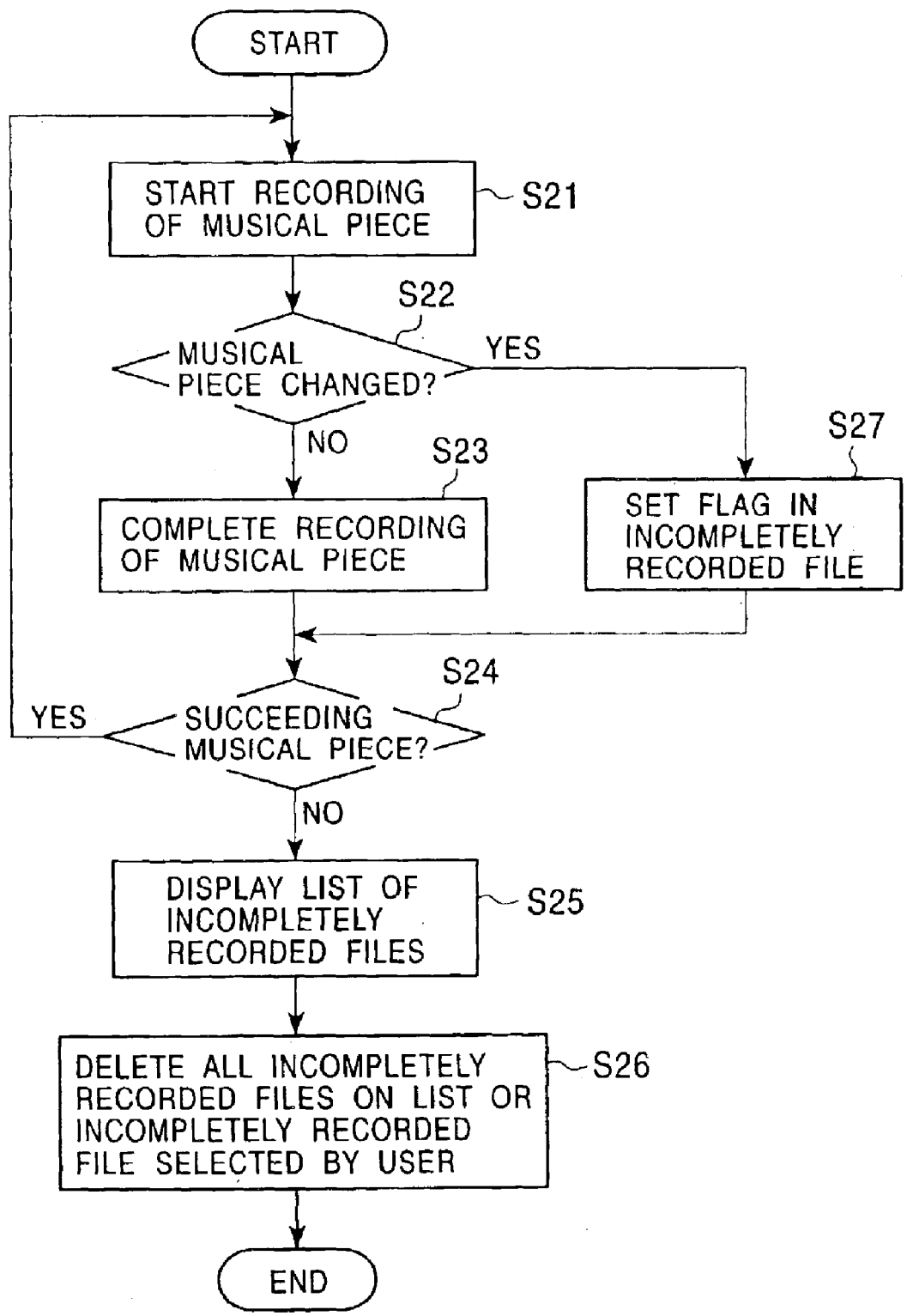
FIG. 4 is a flowchart showing the operation of a music storage apparatus according to a second embodiment of the present invention.

FIG. 4 is a flowchart showing the operation of a music storage apparatus according to a second embodiment of the present invention. The music storage apparatus of the second embodiment is different from the music storage apparatus of the first embodiment by its operation in a second operation mode. Since other structures are basically similar to those in the first embodiment, they will also be described with reference to FIGS. 1 and 2.

First, in Step 21, the music storage apparatus starts recording a musical piece simultaneously with the start of playing of the musical piece. In Step S22, it is determined whether or not directions to change the musical piece are given while the musical piece is being played, that is, whether any of the track search buttons 25 and 26, the stop button 23, and the scan button 30 is pressed. When any such button is not pressed, recording of the musical piece is completed simultaneously with the completion of playing of the musical piece in Step S23.

In Step S24, it is determined whether a succeeding musical piece is present. When a succeeding musical piece is present, Step S21 is performed again so that the succeeding musical piece is recorded. In this way, the musical piece that the user is listening to is recorded as a music file in the hard disk 16.

When directions to change the musical piece are given in Step S22, for example, when any of the track search buttons 25 and 26 and the stop button 23 is pressed, Step S27 is performed. When a music file of a musical piece that is not completely recorded (hereinafter referred to as an "incompletely recorded file") is recorded in the hard disk 16, for example, a flag (hereinafter referred to as an "incomplete recording flag") is set in a title folder of the music file in order to indicate that the musical piece is not completely recorded. Subsequently, Step S24 is performed.

In Step S24, it is determined whether or not a succeeding musical piece is present. When a succeeding piece is present, Step S21 is performed again so that the succeeding musical piece is recorded.

When it is determined in Step S24 that a succeeding musical piece is not present, Step S25 is performed. In Step S25, the control unit 13 searches the music files recorded in the hard disk 16 for incompletely recorded files with incomplete recording flags. A list of the incompletely recorded files is displayed on the display unit 20.

In Step S26, all of the incompletely recorded music files or a specific one of them is deleted from the hard disk 16 according to the directions of the user.

For example, in addition to the list of the incompletely recorded files, the display unit 20 displays a message "Some pieces are recorded incompletely. Should all the pieces be deleted? (YES/NO)". When the user selects "YES", all the incompletely recorded files are deleted from the hard disk 16. In contrast, when the user selects "NO", a screen is displayed on which the user can separately select files to be deleted. On this screen, the user selects an unnecessary music file, for example, by operating the track search buttons 26 and 27 and a predetermined preset button 28. The selected file is deleted from the hard disk 16 by pressing another predetermined preset button 28. As a result, only necessary files remain in the hard disk 16.

Even when incompletely recorded files are left in the hard disk 16, it is preferable that the incompletely recorded files be not played back by normal operation. In the music storage apparatus of the second embodiment, a list of incompletely recorded files is displayed on the display unit 20 by pressing the display-switching button 29 a predetermined number of times. By selecting a desired incompletely recorded file from the list and pressing the playback button 23, playback of the selected file is started.

[Third Embodiment]

Figure 5:
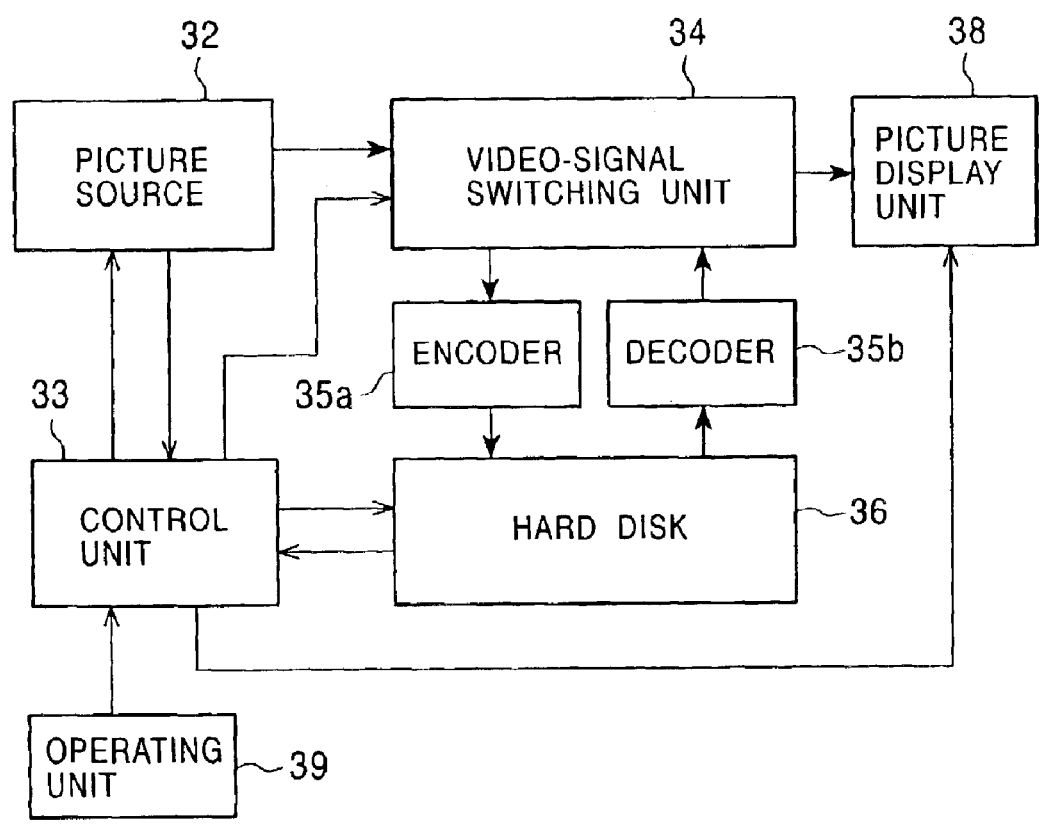
FIG. 5 is a block diagram showing the configuration of a picture storage apparatus according to a third embodiment of the present invention.

FIG. 5 is a block diagram showing the configuration of a picture storage apparatus according to a third embodiment of the present invention.

The picture storage apparatus of the third embodiment includes a picture source 32, such as a digital television tuner, a control unit 33, a video-signal switching unit 34, an encoder 35a, a decoder 35b, a hard disk 36, a picture display unit 38, such as a CRT (Cathode Ray Tube) or a liquid crystal panel, and an operating unit 39.

The video-signal switching unit 34 switches between input signals and output signals according to a signal from the control unit 33. For example, in a first operation mode in which video signals are not recorded in the hard disk 36, the video-signal switching unit 34 directly transmits video signals input from the picture source 32 to the picture display unit 38. In a second operation mode in which a picture is recorded in the hard disk 36, the video-signal switching unit 34 supplies video signals from the picture source 32 to both the picture display unit 38 and the encoder 35a. In a third operation mode in which a picture file recorded in the hard disk 36 is played back, the video-signal switching unit 34 receives video signals from the decoder 35b, and transmits the video signals to the picture display unit 38.

The encoder 35a compresses (encodes) video signals received from the video-signal switching unit 34 by a video-signal compression method, such as MPEG2 or MPEG4, thereby creating a picture file. The picture file is recorded in the hard disk 36.

The decoder 35b decompresses (decodes) a picture file read out of the hard disk 36 and supplies the picture file to the video-signal switching unit 34.

The operating unit 39 includes various control buttons (for example, a channel selection button) for operating the picture storage apparatus. The control unit 33 controls the picture source 32, the video-signal switching unit 34, and the hard disk 36 according to a signal from the operating unit 39. The control unit 33 also appropriately displays information about the operation and information about picture files on the picture display unit 38.

Operation of the picture storage apparatus according to the third embodiment will be described below. As described above, the picture storage apparatus operates in three modes, that is, a first operation mode in which a picture is not recorded and video signals received from the picture source 32 are transmitted to the picture display unit 38, a second operation mode in which a picture is provided to the user according to video signals received from the picture source 32, and simultaneously, the picture is recorded in the hard disk 36, and a third operation mode in which a picture file recorded in the hard disk 36 is played back.

In the first operation mode, the control unit 33 controls the video-signal switching unit 34 so that video signals received from the picture source 32 are directly transmitted from the video-signal switching unit 34 to the picture display unit 38. Consequently, pictures are displayed on the picture display unit 38.

In the second operation mode, the control unit 33 controls the video-signal switching unit 34 so that video signals received from the picture source 32 are transmitted from the video-signal switching unit 34 to both the picture display unit 38 and the encoder 35a. The encoder 35a compresses (encodes) the input video signals by a video-signal compression method, such as MPEG2 or MPEG4, thereby creating a picture file. The picture file is stored in the hard disk 36. In this way, pictures that the user is viewing are recorded as a picture file in the hard disk 36. The picture file is accompanied by data on the recording date (timestamp) and data on the contents of a program (tag).

In the third operation mode, the control unit 33 controls the hard disk 36 to read out a picture file. The picture file is transmitted to the decoder 35b to be decompressed (decoded), and is then transmitted to the picture display unit 38 through the video-signal switching unit 34. Consequently, pictures recorded in the hard disk 36 are displayed on the picture display unit 38.

Figure 6:
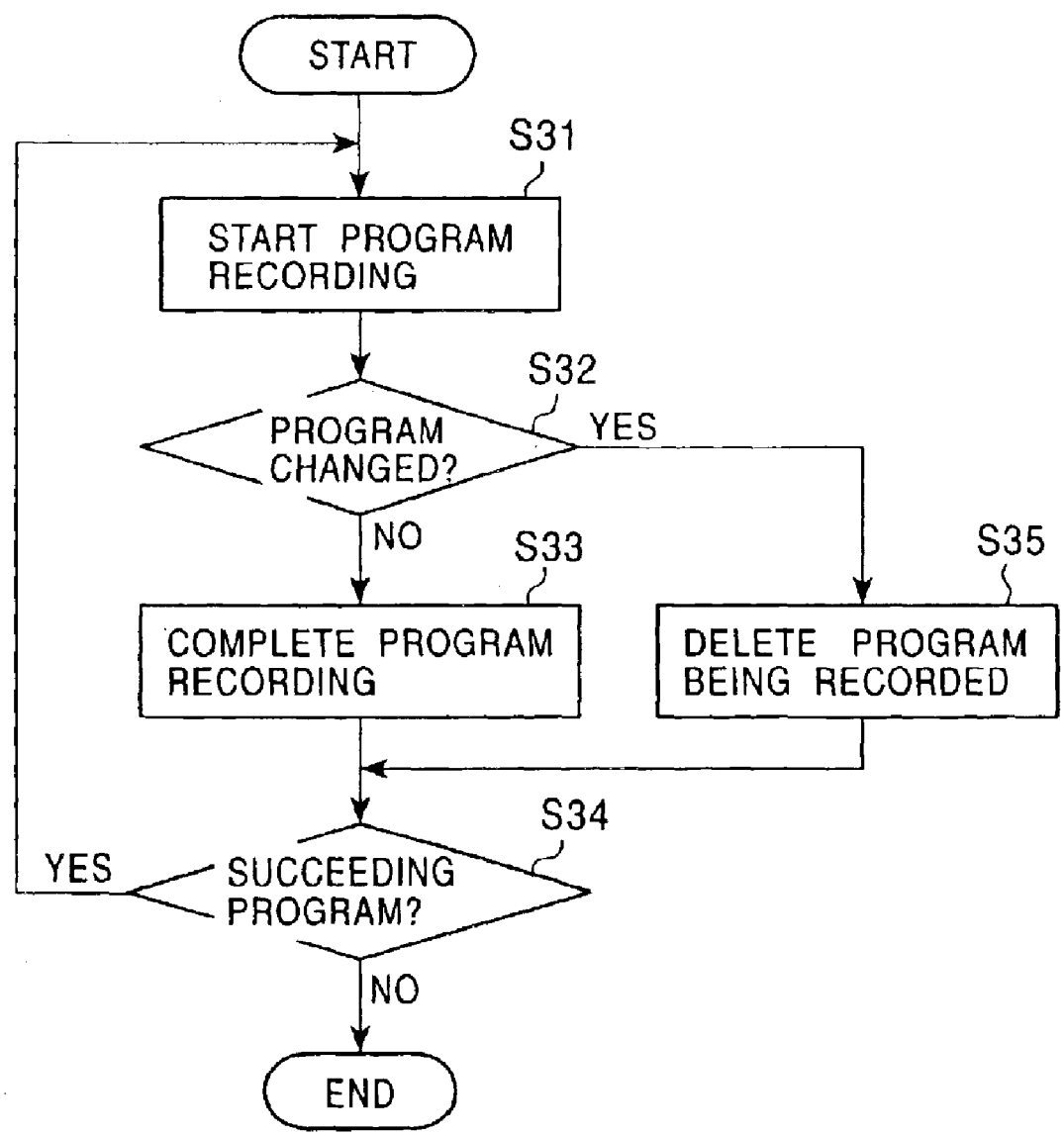
FIG. 6 is a flowchart showing the operation of the picture storage apparatus of the third embodiment.

The second operation mode of the picture storage apparatus of the third embodiment will be described in more detail below with reference to the flowchart shown in FIG. 6.

First, in Step S31, the picture storage apparatus displays pictures on the picture display unit 38 according to video signals received from the picture source 32, and simultaneously starts recording of the pictures (program). In Step S32, it is determined whether or not directions to change the channel (program) are given during the program. When directions are not given, recording of the pictures is completed simultaneously with the completion of the program.

In Step S34, it is determined whether or not a succeeding program is present. When a succeeding program is present, Step S31 is performed again so that the succeeding program (pictures) is recorded. In this way, the pictures that the user is viewing are recorded as a picture file in the hard disk 36.

When directions to change the program are given in Step S32, the picture file of the program that is being recorded is deleted in Step S35, and Step S34 is then performed.

In Step S34, it is determined whether a succeeding program is present. When a succeeding program is present, Step S31 is performed again so that the succeeding program (pictures) is recorded.

When it is determined in Step S34 that a succeeding program is not present, recording of the picture file in the hard disk 36 is completed.

In the third embodiment, as described above, when directions to change the channel during a program are given, a picture file of the program is deleted. Only pictures of completely recorded programs are recorded in the hard disk 36. Therefore, the playback of the pictures is not cut off during the program, and this does not frustrate the user. Moreover, since unnecessary picture files do not remain in the hard disk 36, the hard disk 36 can be used efficiently.

In the third embodiment, a flag may be set in a picture file of each program during which the channel is changed (hereinafter referred to as an "incompletely recorded file"), a list of incompletely recorded files may be displayed on the display unit 38, and the incompletely recorded files may be deleted from the hard disk 36 according to the directions of the user in a manner similar to that in the second embodiment.

While a hard disk is used as the recording device that records music files or picture file in the above-described first to third embodiments, the recording device is not limited to a hard disk, and, for example, other magnetic recording devices, magneto-optical devices, phase-change recording devices, or semiconductor recording devices may be used.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A music storage apparatus comprising:
    an audio signal source for supplying audio signals;
    an audio-signal recording unit for recording the audio signals supplied from said audio signal source;
    an audio-signal switching unit for providing one of the audio signals supplied from said audio signal source and the audio signals recorded in said audio-signal recording unit; and
    a control unit for controlling said audio-signal recording unit and said audio-signal switching unit in response to an operation by a user,
    wherein said control unit starts recording audio signals of a musical piece in said audio-signal recording unit in synchronization with the start of playing of the musical piece, leaves audio signals of an unoperated musical piece in said audio-signal recording unit, and deletes audio signals of an operated musical piece from said audio-signal recording unit, the unoperated musical piece not being subjected to a specific operation during the playing thereof, and the operated musical piece being subjected to the specific operation during the playing thereof.

2. A music storage apparatus according to claim 1, wherein the specific operation includes at least one of stopping, fast-forwarding, fast-reversing, tracking-up, tracking-down, scanning, and channel change.

3. A music storage apparatus according to claim 1, wherein said control unit compares Table-OF-Contents information and time information in a Q-channel subcode in a music compact disk in order to determine whether the playing of the musical piece is completed.

4. A music storage apparatus according to claim 1, wherein said control unit compares the length of the musical piece included in program information from a digital radio with an elapsed time in order to determine whether the playing of the musical piece is completed.

5. A music storage apparatus comprising:
    an audio signal source for supplying audio signals;
    an audio-signal recording unit for recording the audio signals supplied from said audio signal source;
    an audio-signal switching unit for providing one of the audio signals supplied from said audio signal source and the audio signals recorded in said audio-signal recording unit; and
    a control unit for controlling said audio-signal recording unit and said audio-signal switching unit in response to an operation by a user,
    wherein said control unit starts recording audio signals of a musical piece in said audio-signal recording unit in synchronization with the start of playing of the musical piece, and adds, to the audio signals to be recorded in said audio-signal recording unit, data for discriminating between an unoperated musical piece that is not subjected to a specific operation and an operated musical piece that is subjected to the specific operation during the playing thereof.

6. A music storage apparatus according to claim 5, wherein the specific operation includes at least one of stopping, fast-forwarding, fast-reversing, tracking-up, tracking-down, scanning, and channel change.

7. A music storage apparatus according to claim 5, wherein said control unit deletes the audio signals of the operated musical piece from said audio-signal recording unit according to the data.

8. A music storage apparatus according to claim 5, wherein said control unit reads only the unoperated musical piece from said audio-signal recording unit according to the data.

9. A music storage apparatus according to claim 5, wherein said control unit reads only the operated musical piece from said audio-signal recording unit according to the data.

10. A picture storage apparatus comprising:
    a video signal source for supplying video signals;
    a video-signal recording unit for recording the video signals supplied from said video signal source;
    a video-signal switching unit for providing one of the video signals supplied from said video signal source and the video signals recorded in said video-signal recording unit; and
    a control unit for controlling said video-signal recording unit and said video-signal switching unit in response to an operation by a user,
    wherein said control unit starts recording video signals of a program in said video-signal recording unit in synchronization with the start of the program, leaves video signals of an unoperated program in said video-signal recording unit, and deletes video signals of an operated program from said video-signal recording unit, the unoperated program not being subjected to a specific operation before the end of the program, and the operated musical piece being subjected to the specific operation before the end of the program.

11. A picture storage apparatus according to claim 10, wherein the specific operation is a channel change.

12. A picture storage apparatus comprising:
    a video signal source for supplying video signals;
    a video-signal recording unit for recording the video signals supplied from said video signal source;
    a video-signal switching unit for providing one of the video signals supplied from said video signal source and the video signals recorded in said video-signal recording unit; and
    a control unit for controlling said video-signal recording unit and said video-signal switching unit in response to an operation by a user,
    wherein said control unit starts recording video signals of a program in said video-signal recording unit in synchronization with the start of the program, and adds, to the video signals to be recorded in said video-signal recording unit, data for discriminating between an operated program that is not subjected to a specific operation and an operated program that is subjected to the specific operation before the end of the program.

13. A picture storage apparatus according to claim 12, wherein the specific operation is a channel change.

14. A picture storage apparatus according to claim 12, wherein said control unit reads only video signals of the unoperated program from said video-signal recording unit according to the data.

15. A picture storage apparatus according to claim 12, wherein said control unit reads only video signals of the operated program from said video-signal recording unit according to the data.

16. An automated method of storing a program comprising one of audio and video, the method comprising:

supplying audio and/or video signals for playing a program from a signal source, for listening and/or viewing by a user;

recording the program if a specified operation by the user is not instructed during playing of said program; and not recording the program if said specified operation by the user is instructed during playing of said program.

17. A method according to claim 16, wherein the specified operation includes at least one of stopping, fast-forwarding, fast reversing, tracking-up, tracking-down, scanning, and channel change.

18. A method according to claim 16, wherein the program is a musical piece, and the signal source is one of a CD player and a radio tuner.

19. A method according to claim 16, wherein the signal source is a television tuner.

20. A method according to claim 16, wherein the portion of the program, recorded before said specified operation by the user is instructed during playing of said program, is automatically deleted.

21. A method according to claim 16, wherein the portion of the program, recorded before said specified operation by the user is instructed during playing of said program, is deleted at the instruction of the user.

* * * * *